Figure 1:
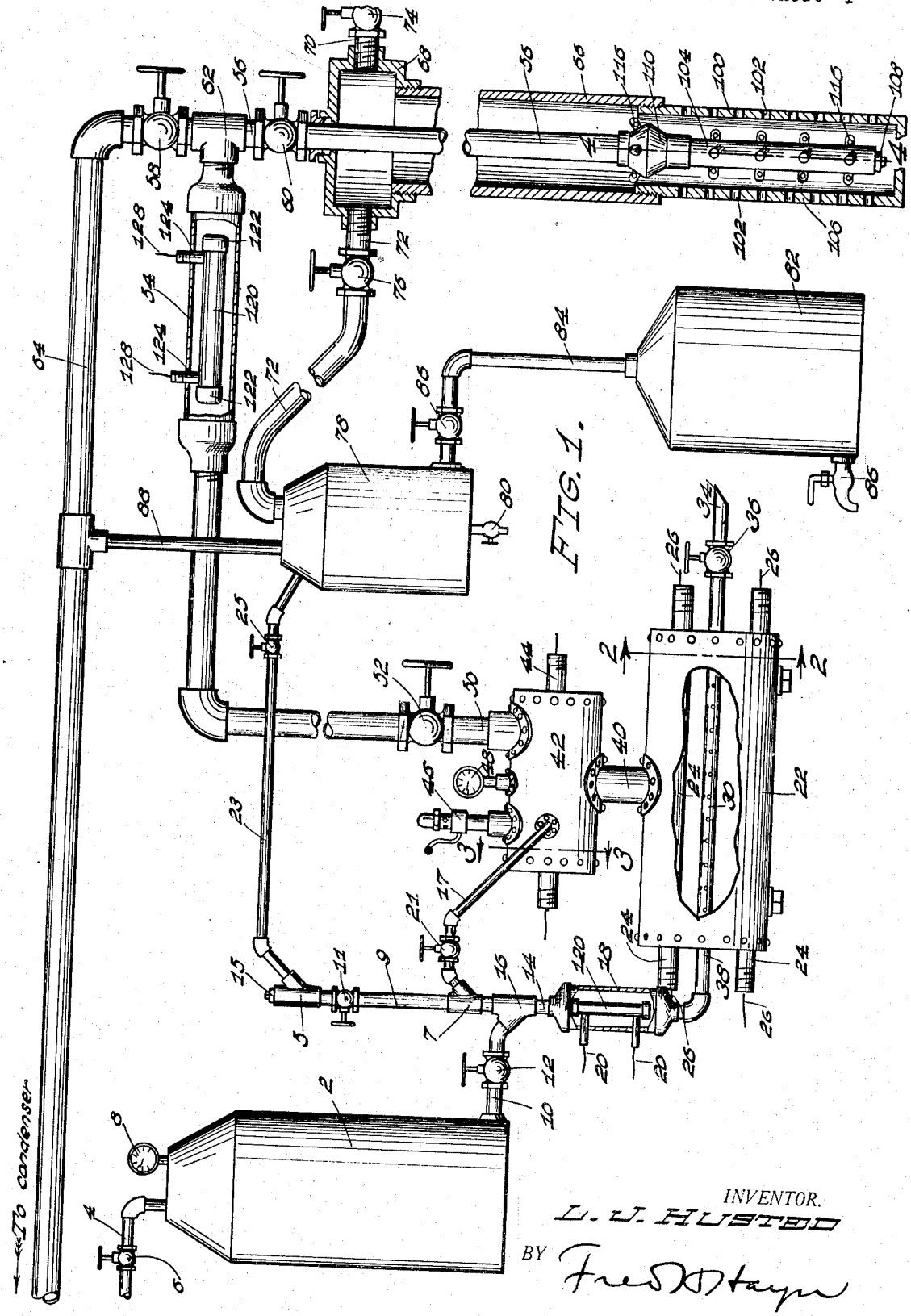

July 1, 1930.   L. J. HUSTED   1,768,984
OIL WELL APPARATUS
Original Filed Aug. 18, 1926   2 Sheets-Sheet 1

INVENTOR.
L. J. HUSTED
BY
ATTORNEY.

July 1, 1930.    L. J. HUSTED    1,768,984
OIL WELL APPARATUS
Original Filed Aug. 18, 1926    2 Sheets-Sheet 2

INVENTOR.
L. J. HUSTED
BY Fred H Hayn
ATTORNEY.

Patented July 1, 1930

1,768,984

UNITED STATES PATENT OFFICE

LEMUEL J. HUSTED, OF LOS ANGELES, CALIFORNIA

OIL-WELL APPARATUS

Application filed August 18, 1926, Serial No. 129,913. Renewed April 7, 1930.

My invention relates to a novel form of process, system and apparatus for recovering the fluid remaining in an oil reservoir or stratum either after the well has ceased to flow or can no longer be pumped with profit, after wells cease to produce commercially, it being generally conceded that from 40 to 60% of the quantity of oil produced from the well still remains in the earth stratum.

A number of methods for recovering the oil remaining in a well after profitable production has ceased have been proposed but all have in practice proven more or less unsatisfactory. The character of the formation, the porosity of the sands, the viscosity of the oil differ in the various oil fields. Sand migrating with the oil, alkaline substances in the formation or other conditions often cause a well to become choked, bridged or sanded up, necessitating the pulling of the tubing, bailing, or even re-drilling, and sometimes the abandonment of the well. By the use of my invention all these difficulties are overcome.

In the study of production, dissolved gas, as well as free gas, must be considered, for with a pressure drop much of the dissolved gas becomes free gas and serves to deliver oil to the well; wet gas causes a greater change in the viscosity of oil than does dry gas.

It accordingly is an object of my invention to provide a novel form of process in which gas or vapors are used or generated preferably from crude oil or its by-products, said gas or vapors being pre-heated, heated and super-heated and then conveyed to the well, the pressure of said gas or vapors blowing out the well and causing the fluid to be lifted, the heated gas or vapors, or the lifted fluid itself, or both assisting in injecting said gas or vapors into the pre-heated portions thereof.

It is also an object of my invention to provide a novel form of fluid lifting system or apparatus consisting of a gas or vapor generator having a set of pre-heating, heating and super-heating appliances for raising the temperature and pressure of the generated gas or vapors, the pressure of which causes the well to be blown and the fluid lifted.

Another object of my invention is to provide a novel form of apparatus in which the lifted fluid or the heated gas or both coact with the gas or vapors generated to inject the latter into the stream line, and preferably into the pre-heater associated with my apparatus.

A still further object of my invention is to equip the end of the stream line of my apparatus with a tubing having therein a pressure operated valve, a set of valved outlets being positioned in said tubing, above said pressure valve, and a set of valved outlets below said valve, said last named outlets functioning to permit the blowing of the well, and at the same time prevents the fluid to be lifted from entering said tubing, my apparatus being moreover equipped with means for controlling the various appliances or placing them selectively into and out of operation as desired or needed.

It is also within the province of my invention to provide the well casing with a header from which several valved conduits are led so that the lifted fluid may be conveyed to a receptacle or set of receptacles, certain of which may be fluid traps and other receptacles for drawing off the fluid or the heavy residuum of the fluid, there being also if desired a valved conduit leading from the gas or vapor stream line to a condenser. No compresser is needed with my apparatus, thereby providing marked economy in installation, and production.

It is also an object of my invention to provide a novel form of apparatus, system and process which is simple in character, the apparatus being simple and easy to construct and install, composed of a minimum number of instrumentalities, thoroughly effective and efficient in operation, and one which will thoroughly and reliably effect the objects intended.

A still further object of my invention is to utilize the expansive power of the gas or vapors of crude oil, its by-products, or other vapors by pre-heating, heating and super-heating them, and confining them in a proper receptacle till the desired pressure is accumulated. It is this pressure that I utilize as a means for lifting the fluid from a well. Moreover, when the perforated pipe at the bottom of the well becomes sanded, choked, or waxed up, I utilize said pressure to blow away and out of said perforations the sand or substances so choking or waxing said pipe, making it possible for the fluid in the strata or reservoir to flow into the well.

It may also be stated that by the use of my invention oil may be effectively and efficiently refined and kept from caking by using the vapors or gas in the manner hereinbefore stated to agitate the crude oil, thus keeping said oil from coking, etc.

Further objects and advantages of my invention will become more apparent as the description thereof proceeds.

Figure 2:
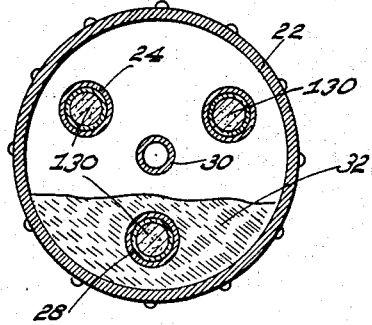
Figure 3:
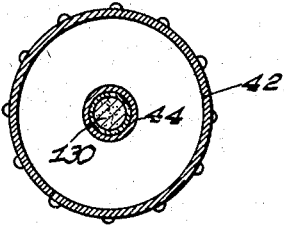
Figure 7:
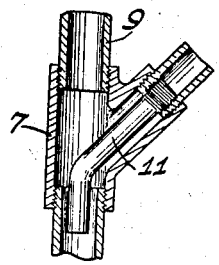
Figure 9:
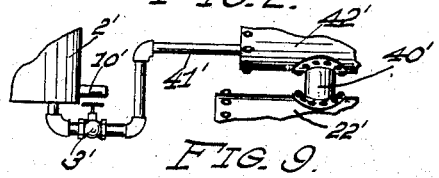
Figure 5:
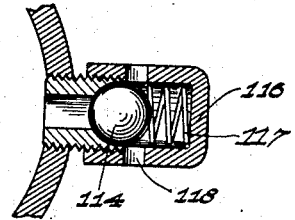
Figure 8:
Figure 6:
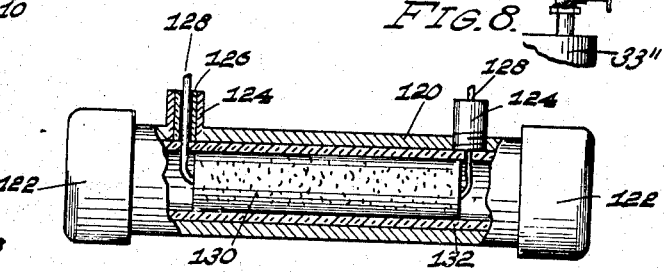
Figure 4:
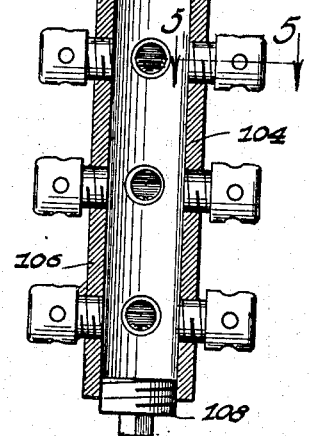

Reference is had to the accompanying drawings, in which similar reference characters denote similar parts. In the drawings, Fig. 1 is a more or less diagrammatic, fragmentary and part sectional view of the system or apparatus for carrying out my novel process, Figs. 2, 3 and 4 are enlarged cross-sectional views on the line 2—2, 3—3, and 4—4, respectively of Fig. 1, looking in the direction of the arrows, Fig. 5 is a similar view on the line 5—5, Fig. 4, also looking in the direction of the arrows, Fig. 6 is a part elevational and part cross-sectional view of a form of electric heater or superheater adapted to be used with my apparatus, Fig. 7 is a detail cross-sectional view through one of the injectors shown in Fig. 1, Fig. 8 is a fragmentary elevational view of a modification, and Fig. 9 is also a fragmentary elevational view of a still further modification.

Describing my invention more in detail, as is well known, all oil sands become saturated with the oil, the amount absorbed depending upon the character of the sand, some sand is coarse, and others so fine that the capillarity of the fluid has such a firm grip on said fluid that the oil and gas cannot penetrate said sand, except by the excessive pressures.

Further, some sands migrate with the oil, and this feature as well as earth stratum pressures, gas pressures or other causes frequently entail the chocking of the well, by sanding or bridging, necessitating the pulling of the tubing, the flushing of the well, bailing, redrilling, or even the abandonment of the well. All of these involve a great outlay of money and enormous losses in time, and production.

Various methods or processes and apparatus have in the past been conceived and tried to overcome these objectionable features, such as the introduction of steam, air, and dry gas into the well, or even heat derived from an electric or gas heater positioned in the well. It is admitted of course, that each of these has some merit, but on the whole fails to accomplish the desired result.

To overcome the above noted defects, I have evolved a novel process, system or apparatus by means of which it is possible to apply heated gas or vapors to the oil and sands in the well, thus decreasing the viscosity of the oil without causing said oil to emulsify as much as in the case where steam or cold compressed gas is used, or to air or cold compressed gas is used, or to harden the sand or sediment, as is often the case when a heater is used in the well which only gasifies the lighter hydro-carbons thus leaving the heavy hydro-carbons in the well, which in time forms a hard-non-porous sediment in the well. The gas or vapors so generated by confining the crude oil or its by-products in a container, and the pre-heating, heating successively and super-heating said gas or vapors so made and used will expand and generate the desired temperature and pressure, to lift the fluid from the well and to also heat the oil in the well so as to convert some of the lighter hydro-carbons in the oil into a gaseous vapor which increases the pressure necessary to lift the fluid, and the condensation of this gaseous vapor so generated will yield considerable gasoline content without the aid of refining processes.

It has heretofore been proposed to utilize compressors, using the compressed gas or air atmospheric temperature to lift the fluid in the well, which when compressed, is at atmospheric temperature with plenty of pressure but no heating qualities. My process is precisely the reverse of this; I need no compressor whatever, but by heating the gas or vapors, it expands them, and this expansive force, and the absorption qualities of hot gas and vapors accomplish my purpose herein described.

As seen in the drawings, the container or chamber 2, which is adapted to house the crude oil or its by-products, such as kerosene, fuel oil and the like, a pipe connection 4, with a controlling valve 6 being used to admit said oil, is provided, said container being equipped with a suitable pressure gauge 8.

Such crude oil, when confined as shown, and heat is applied, turns into a gas or vapor, and when confined, the pressure, as well as the temperature, is increased as further heat is applied. It is this pressure that I utilize to blow out the well, to lift the fluid and heat the oil sands.

The gas or vapors generated in the container or generator 2, is passed by means of a connector 10, equipped with a controlling or regulating valve 12, from any desired point on said generator, to a piping 14, provided with any preferred connection such as the Y 16, to the pre-heater 18, which may be a convenient form of electric or other heater having associated therewith the electric leads 20, said leads and heater being housed as shown, which heater is more particularly shown in Fig. 6, to be presently described. After being pre-heated, the gas or vapors are passed into a heater 22, also preferably of the electric type, which heater in its preferred form is cylindrical in shape, as depicted in Fig. 2, and contains a set of electric heating elements 24 of any desired number, the preheated gas or vapors being conducted by the pipe 38 to its perforated connection 30 within the heater 22, a pipe 34, controlled by a valve 36, being provided to conduct away said gas or vapors, if desired. One or more electric heating elements 28 are positioned in the lower part of the casing of the heater 22 and covered with sand or other heat retaining material 32, said heater thus functioning as a heat accumulator or heat storage means. Any preferred number of such heaters or accumulators, in series or in parallel may be provided.

Preferably in series with the heater 22, and connected thereto by the pipe 40, is another heater, equipped with a heating element 44 of any preferred type, said heater functioning also as a dome for the reception of the heated gas or vapors transmitted thereto from the heater 22, any desired form of pressure relief valve 46, and a pressure gauge 48 being associated with the heater or dome 42, a pipe 50, with a valve 52 and suitable pipe connections leading the heated gas or vapors to the super-heater 54, which may also take the form depicted in Fig. 6, to be presently described. Said superheater is connected in a conventional or other manner to the dome and up stream piping 56, equipped with controlling valves 58 and 60 above and below the point 62 to which the piping 50 connects with the piping 56, a pipe 64, controlled by the upper valve 58, leading to a condenser.

The pipe 56 is positioned in the well tubing 66, which is preferably equipped at the top in any desired manner with a header 68, from which header may lead any desired number of pipe connections 70 and 72, controlled respectively by valves 74 and 76, so that the lifted fluid may be passed to any point desired, the valved pipe 72 leading to a gas trap 78, equipped, preferably in the lower portion thereof, with a valved outlet 80, said trap being connected to a receptacle or tank 82 by the pipe 84, controlled by the valve 86. If desired, a by-pass pipe 88 may be provided to permit the fluid in the trap 78 to be conveyed to the pipe 64 and thence to the condenser.

The lower portion of the casing 66 is connected in any preferred manner with the ported line pipe 100, the ports 102 permitting the ingress of the fluid from the oil stratum, and it is through these ports that the well is blown by the gas or vapors issuing through the inner perforated tubing 104 presently to be described. This inner tubing is more particularly shown in Fig. 4.

The tubing 104 is preferably composed of a lower cylindrical portion 106, equipped with a closing plug 108 or other device, said lower portion, if desired being screwed into a combined cylindrical and double conical upper portion 110. Of course, any other form of tubing may be substituted for that shown and described, and still remain within the province of my invention.

Positioned within the tubing 104, and preferably within the upper portion 110, is a pressure valve 112 of conventional or other form, said valve being capable of adjustment as shown or in any other desired manner, the exact form said valve takes in practice being immaterial.

Preferably situated in the upper conical portion of the upper part 110 is an upper set of outlet valves 114, of any desired form and number, the form shown being of the ball type, and positioned within the cage 116, a spring 117 retarding the action of the ball 114, a set of ports 118 being provided to permit the egress of the gas or vapors. The lower portion 106 of the tubing is also provided with any number of similar outlet valves, which prevent the fluid and sand in the well from entering the tubing 104 in case the pressure valve 112 is closed.

The preferred type of electric heater is depicted in Fig. 6 and comprises a housing 120, equipped with detachable ends or caps 122 to permit assembly and disassembly, said ends or caps being associated with the housing 120 in any manner preferred, a set of nipples 124 equipped with insulators 126 to insulate the electric leads 128, leading to the composition carbon 130, insulated from the casing 120 by the insulator 123. Of course any other preferred form of heater may be substituted for that shown. Further, the pre-heater 120, may be of identical construction as hereinbefore explained. This is also true of the heating elements positioned within the heaters 22 and 42.

To assist in injecting the gas or vapors issuing from the generator 2 into the pre-heater 18, I provide a set of injectors 5 and 7, shown in detail in Figs. 7 and 8, an upstanding pipe 9, with a controlling valve 11, and plugged as at 15, being associated with the pre-heater 18. If desired, the injector 7, which may be of conventional form is connected by pipe connections 17, controlled by a valve 21, to the heater or dome 42, the injector 5, being connected by a piping 23, controlled by a valve 25, to the gas trap 78. It will be understood that said injectors may be tapped into any part of the stream line of the gas or vapors or the fluid line as desired. The heated gas or fluid coming in contact with the cooler gas or vapors, condensation results, and hence produces the injection of said gas or vapors into the pre-heater 18.

The operation of my novel process, apparatus or system should now be clear. The crude oil or its by-products having been passed into the generator 3 and confined therein under pressure, the gas or vapors are generated and passed through the Y 16 to the pipe 14, and thence into the pre-heater 18, heated by the heating element 120.

The pre-heated gas or vapors enter the heater 22 through the perforated pipe 30, where the temperature and pressure are raised, the sand 32 retaining a large portion of the heat, making for marked economy in operation, said gas or vapors passing into the dome 42, where it is again heated and its pressure increased still more, thence passing to the pipe 50 where said gas is super-heated in the chamber 54, the pipe 17, leading to the injector 7 assisting in injecting the cooler gas into the pre-heater 18.

The apparatus is now in condition so that the oil in the well may be lifted or the well blown. If the sand has seeped into the line pipe 100, through the ports 102, the valve 60 is opened, and the gas or vapors under pressure opens the valve 112, said gas or vapors escaping through the outlet valves 114, effectively blowing the well, the gas or vapors heating the sand in the oil stratum, gasifying or vaporizing the oil, preventing the caking and solidification of the mud and sand. The pressure of the gas or vapors overcomes the capillarity of the sand, releasing said oil therefrom, the temperature of said gas or vapors decreasing its viscosity so that the oil, which enters the perforations 102, may be lifted by the pressure of said gas or vapors.

The springs associated with the valves 114 and 112 may be made of such a strength so that said valves function at the proper time and are responsive to pressure conditions. The fluid is then lifted to the header 68 and conducted thence to the gas trap 78, and thence to the tank 82. The valve controlled pipe 23 leading to the injector 5, causes the lifted fluid to assist in injecting the generated gas or vapors into the pre-heater 18. The valve 58 permits the gas or vapors to be passed to the condenser as desired. The by-pass pipe 88 also permits the lifted fluid to be passed to the condenser. No compresser is needed with my apparatus.

It is also within the province of my invention to provide a means for agitating any liquid which may be used in the generator. For example, if crude oil or any heavy liquid is used, it must be kept moving or it would coke. So by using the vapors or gas generated, say, for example, those in the dome or heater 42, the liquid in the generator 2 is constantly kept in a state of agitation, without decreasing the temperature as would happen in case steam was used.

Such a construction is suggested by Fig. 9, in which the generator 2', equipped with its outlet pipe 10', is connected by a bleeder-pipe 41' equipped with a shut off valve 3' to the dome or heater 42', which in turn is connected by the conduit 40' to the heater 22'.

It is of course preferable to super-heat the gas or vapors used by installing in close proximity to the well a super-heater so as to provide against the condensation of the vapors in passing through the line thus giving at the well the full amount of pressure generated at the generator as it may be desirable to operate several wells from the one unit, even though the wells are far away and at the same time preventing the vapors or gas from condensing.

The most physical character of petroleum is its ability to pass into vapors when exposed to the atmosphere, or when heat is applied, and the vapors generated from crude oil or its by-products increase in pressure and volume as the temperature rises, entirely independent of the natural gas it may contain.

As hereinbefore stated, the vapors I use, being a by-product of petroleum, is a solvent, and readily mixes with the crude oil, thus increasing the gravity. Obviously, then, the vapors generated in the generator, used for lifting the fluid or blowing out the sand, dirt and the like accumulated in and around the perforated tubing 104, in the bottom of the well, being hot, will of necessity generate from the petroleum in the wall a large percent of the lighter hydro-carbons in said petroleum, thus providing an additional supply to lift the fluid from the well, and at the same time agitate it so as to prevent any heavy material from settling in the well.

In referring to the gas or vapors hereinbefore mentioned, these must be differentiated from the natural gas present in or with the oil. The gas or vapors I use in my novel form of apparatus are those which will condense back into liquids or which will absorb the lighter hydro-carbons. Some of these natural gases are called dry or lean and will not liquify—even when compressed under ordinary conditions or temperature, but will absorb liquids. It is a well-known law of physics that when vapors are separated from the liquid from which they are derived, they increase $\frac{1}{470}$ of their volume for each degree of heat applied. Hence these vapors or gases when confined create a pressure and increase in volume and pressure as heat is applied, and it is this pressure that I use in my process as hereinbefore set forth.

In the known processes or methods, there are considerable losses in pressure by condensation. In my process the losses by condensation are practically nil, since the hot vapors heat the oil and keeps it at a temperature above the boiling point of said vapors, and what negligible quantity that may condense, being a solvent, thins the oil and permits it to flow more freely, resulting in a markedly valuable and economical process.

It will of course be understood that I do not desire to be limited to crude oil merely in my novel form of process, for I may use a supply tank such as shown in the drawings, filled with water, apply a few pounds to the tank, tap a small steam boiler line in the dome of a boiler, such as used for example in oil well practice, and use said water as previously described in connection with the crude oil, in the generator 2, the steam coming in contact with a small stream of water from the supply tank, heats said water almost to its boiling point, and as this is injected into a boiler or heater, such as the heater 22, it is almost steam of a certain quality. Moreover, a small amount of fluid may be retained in the receptacle 22, which may be sprayed as hereinbefore shown and described.

In Fig. 8 I have shown a modification in which petroleum may be refined. In said figure the tank 22″ is slightly tilted as shown, and is provided at its lower point with a drain valve 25″. This drain pipe, if desired, may be connected with a storage tank to permit the residuum of crude oil or liquid to pass therein, the vapors rising into the dome or second heater as in the other form of my invention, thus refining the oil.

While I have thus described my invention with great particularity, it will thus be obvious that it may be modified throughout a wide range. I therefore do not propose to be limited to the exact details of construction shown and described, but reserve the right in practice to make any and all modifications thereof that fall within the scope of the appended claims.

I claim as my invention:

1. In a fluid lifting system, including the tubing of an oil well, the combination of a generator, a set of pre-heaters, heaters and super-heaters in series with said generator and said tubing, a receptacle for receiving the lifted fluid, a valved pipe line connecting said receptacle and said pre-heater, an injector in said pipe line, a valved connection between one of said heaters and said pipe line, and an injector associated with said connection and said pipe line.

2. A well rejuvenating and fluid lifting apparatus, comprising in combination with the well tubing, a device for vaporizing a petroleum hydrocarbon, a plurality of heaters connected to said device for converting the wet constituents of the vapors derived from said device into vapors, and maintaining said vapors under their self-imposed expansive pressure, means associated with one of said heaters for assisting the introduction of the vapors from said device into another of said heaters, means to superheat said vapors, and a valve to release said vapors into said tubing.

3. A well rejuvenating and fluid lifting apparatus comprising in combination with the well tubing, a generator for producing hydrocarbon vapors, a plurality of heaters for converting the hydrocarbon vapors into a gaseous product and maintaining said gaseous products under their self imposed expansive pressure, a superheater connected to said heaters to superheat the gaseous products, a valve to admit the superheated gaseous products to said well tubing, a receptacle for receiving the lifted fluid and a valved injector connection between said receptacle and one of said heaters.

4. An apparatus for rejuvenating wells and lifting fluids therefrom comprising in combination with the well tubing, a plurality of interconnected devices for converting a petroleum hydrocarbon into a gaseous fluid and maintaining the gaseous fluid thus converted under its self imposed expansive pressure, a valve to admit the gaseous fluid into said tubing to rejuvenate the well and lift the liquid, a receptacle for the lifted liquid and gaseous fluid, a pipe connection between said receptacle and one of said interconnected devices, and at least one injector in said pipe line, whereby a continuous circulation of the gaseous fluid in the well results with a continuous lifting of the liquid therein.

In testimony whereof I have signed my name to this specification.

LEMUEL J. HUSTED.